Figure 4:
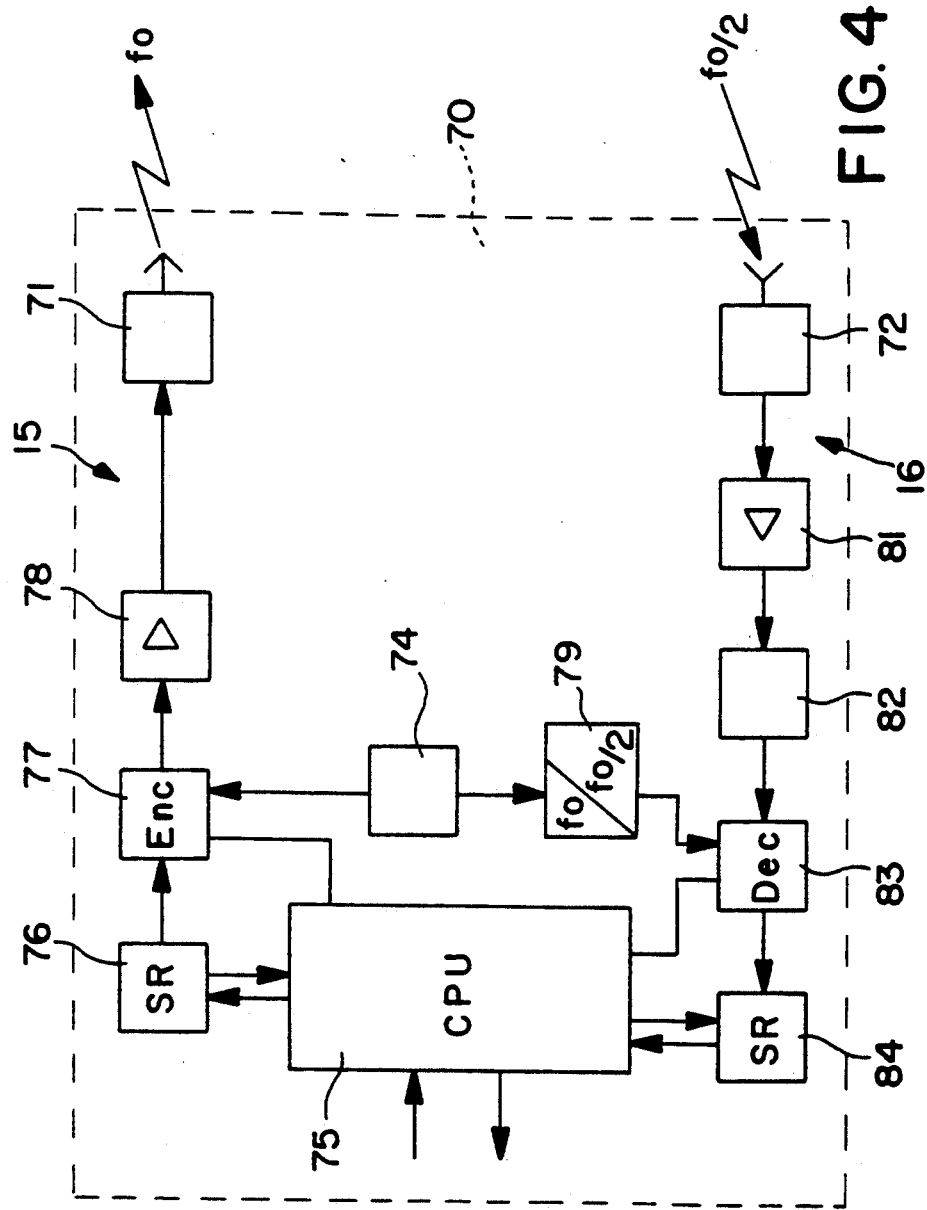

United States Patent [19]

Kocznar et al.

[11] Patent Number: 5,202,550

[45] Date of Patent: Apr. 13, 1993

[54] DEVICE FOR MACHINE COMMUNICATION IN DATA TRANSMISSION

[75] Inventors: Wolfram Kocznar, Innsbruck; Kurt Wallerstorfer, Strasswalchen, all of Austria

[73] Assignee: Skidata Computer Gesellschaft M.B.H., St. Leonard-Gartenau, Austria

[21] Appl. No.: 911,269

[22] Filed: Jul. 7, 1992

Related U.S. Application Data

[63] Continuation of Ser. No. 392,534, Jun. 23, 1989, filed as PCT/AT87/00060, Oct. 16, 1987, abandoned.

[30] Foreign Application Priority Data

Oct. 23, 1986 [AT] Austria ................................ 2819/86
Oct. 23, 1986 [AT] Austria ................................ 2820/86
Oct. 23, 1986 [AT] Austria ................................ 2828/86

[51] Int. Cl.⁵ .................... G06K 5/00; G07C 9/00; G07F 7/08; G07B 15/04
[52] U.S. Cl. ............................ 235/382; 235/380; 235/384
[58] Field of Search .............. 235/379, 380, 382, 384, 235/468; 902/4

[56] References Cited

U.S. PATENT DOCUMENTS

| | | | |
|---|---|---|---|
| 3,806,874 | 4/1974 | Ehart | 235/375 X |
| 4,325,146 | 4/1982 | Lennington | 235/382 X |
| 4,338,587 | 6/1982 | Ghiappetti | 340/22 X |
| 4,399,437 | 8/1983 | Goldman | 235/382 X |
| 4,476,468 | 10/1984 | Goldman | 235/380 |
| 4,501,958 | 2/1985 | Glize | 235/382 |
| 4,555,618 | 11/1985 | Riskin | 235/472 |
| 4,853,524 | 8/1989 | Yamaguchi | 235/468 |

FOREIGN PATENT DOCUMENTS

| | | |
|---|---|---|
| 1184658 | 3/1985 | Canada . |
| 0057603 | 1/1982 | European Pat. Off. . |
| 0058029 | 1/1982 | European Pat. Off. . |
| 0086286 | 2/1982 | European Pat. Off. . |
| 0057602 | 8/1982 | European Pat. Off. . |
| 0089087 | 3/1983 | European Pat. Off. . |
| 0019280 | 9/1984 | European Pat. Off. . |
| 0142013 | 10/1984 | European Pat. Off. . |
| 0168836 | 7/1985 | European Pat. Off. . |
| 0196028 | 3/1986 | European Pat. Off. . |
| 0246374 | 5/1986 | European Pat. Off. . |
| 0168642 | 10/1986 | European Pat. Off. . |
| 0257688 | 8/1987 | European Pat. Off. . |
| 61-17425 | 7/1986 | Japan ................................ 235/468 |
| 2151987 | 7/1985 | United Kingdom . |
| 2164825 | 3/1986 | United Kingdom . |

*Primary Examiner*—Harold Pitts
*Attorney, Agent, or Firm*—Lorusso & Loud

[57] ABSTRACT

For automated communication in a limited acquisition space, for example in order to identify or check an access authorization, use is made of active data supports which comprise a transmitter (15), a receiver (16), a read-write memory, an electric clock, a computer, a display and a power source (7). The checking station is also provided with a transmitter-receiver to check and possibly modify the data. Each transmitter-receiver has a limited communication space, of which the maximum extent is less than the minimum extent of the acquisition space. In this way it is not necessary to plug in the data support, of which a precise point must, however, be deliberately brought close to the checking station. In this way a definite coordination between the checking station and a further data support is prevented.

16 Claims, 6 Drawing Sheets

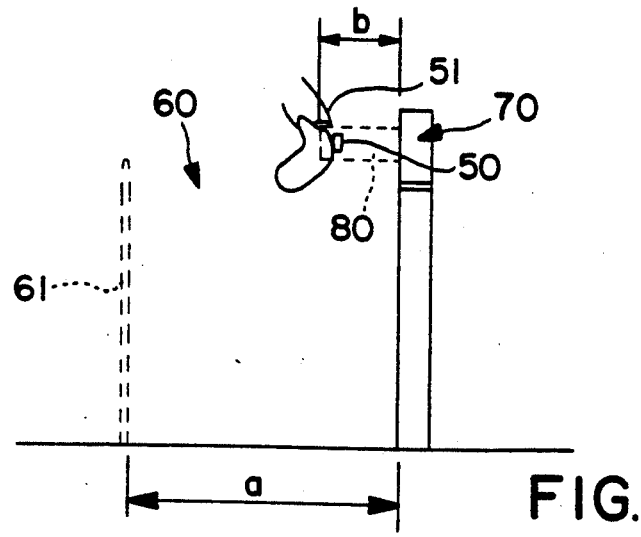
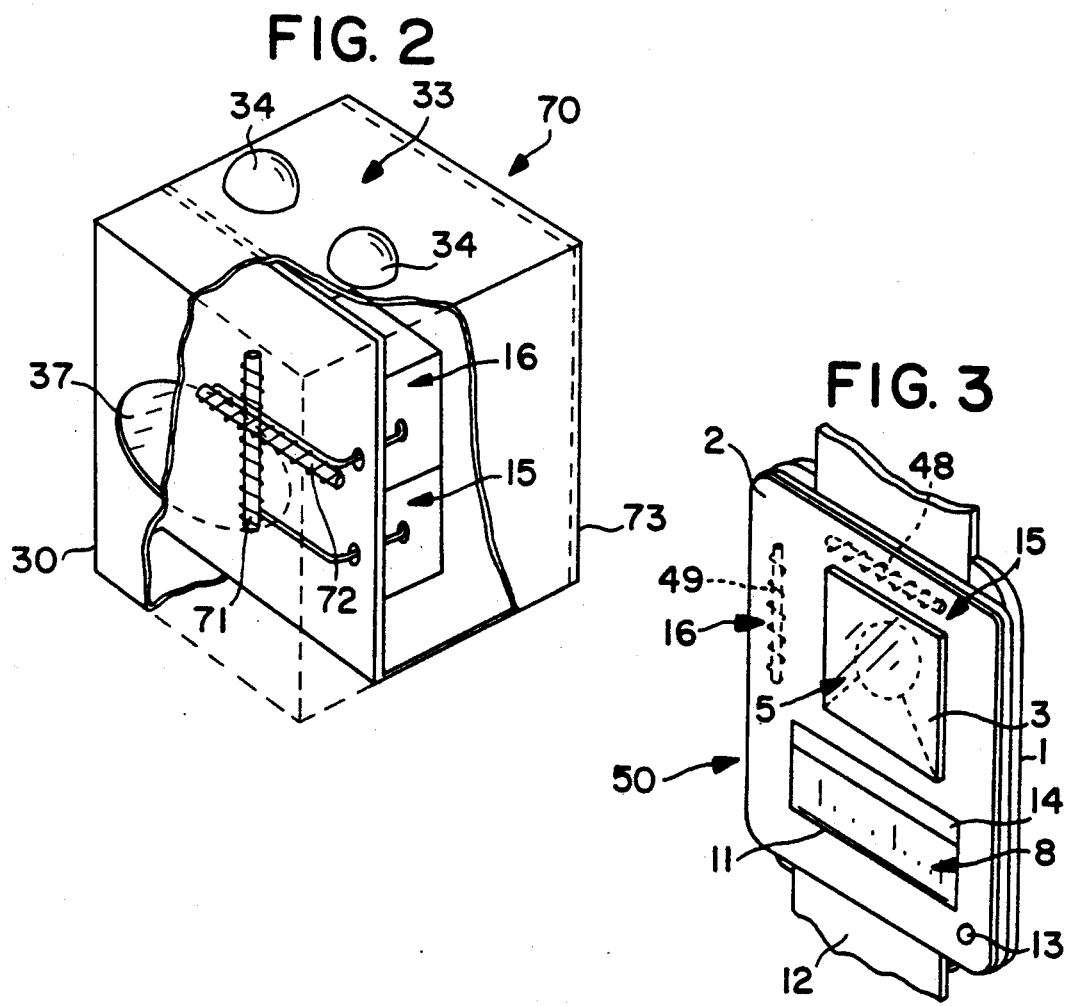

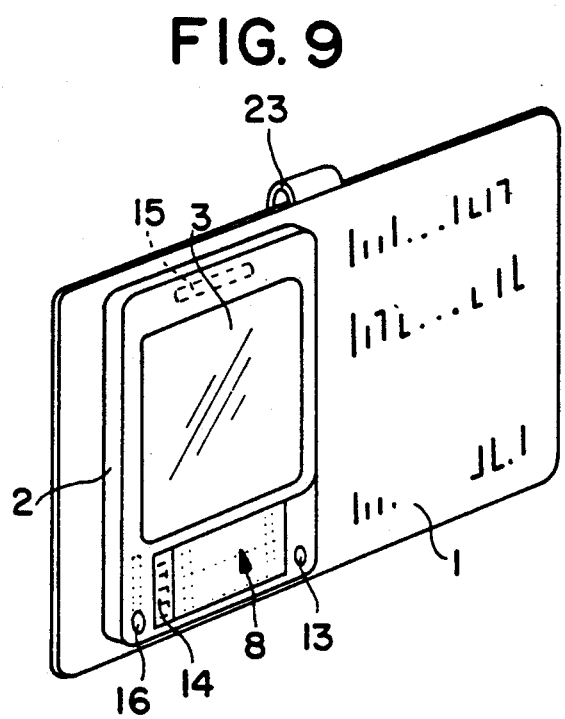
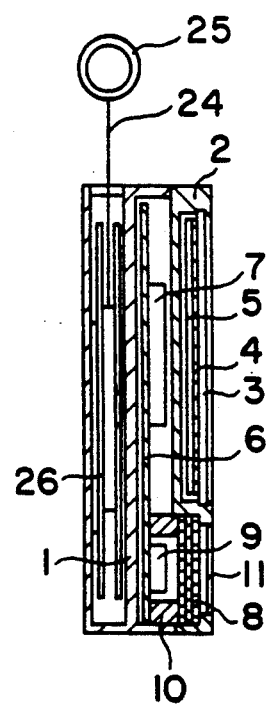
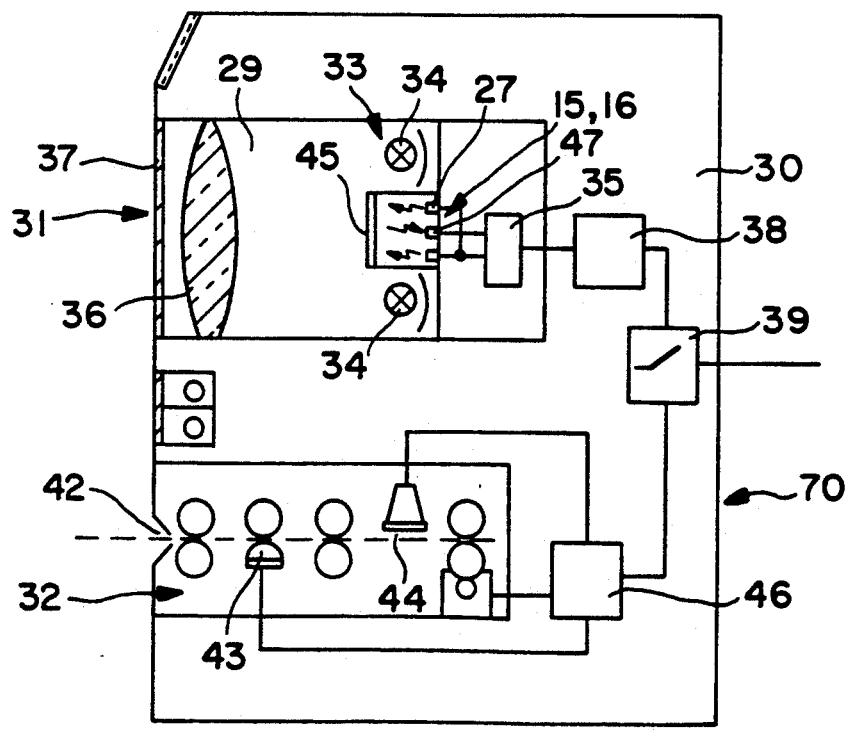

DEVICE FOR MACHINE COMMUNICATION IN DATA TRANSMISSION

This is a continuation of application Ser. No. 392,534, filed Jun. 23, 1989, filed as PCT/AT87/00060, Oct. 16, 1987, now abandoned.

The invention concerns a device for machine communication in a data-entry space where data checking and/or changing takes place particularly for checking the access rights to a transit lane, with one data carrier supplied with data in an initialization station per object to be checked, and with at least one control station, where each data carrier contains at least one memory, plus preferably a computer and a display, and each control station has a sending/receiving unit for contact-free data transmission. Such devices have various applications like in ski lifts to check or validate tickets, in parking garages to authorize entry or exit, etc.

Until now, magnetic cards and punch cards, etc., i.e., passive data carriers, have been used for identification of persons, or access control. Since these must be inserted into the slot of a reading device at the control station, this entails a relatively large expenditure of time and unpleasantness for the user, especially for the applications described.

In addition, devices are known like those described that have active data carriers, where information is retrieved from the data carrier at the control station, and the data carrier itself contains electronic components, like a memory, computer, display, etc. Examples of this are EP-B-19280 (an ID card with electrical contact surfaces), EP-A 142 013 (a data carrier with inductive data transmission and mechanical data destruction), EP-A-168 836 (a data card for automatic cash-dispensing machines with optical data transmission), EP-A-196028 (a credit card with electrical contact surfaces) and WO-A-86/04705 (a telephone credit card with inductive data transmission).

In contrast to the magnetic or punch cards, the expensive data carriers cannot be used for general purposes like those described earlier not only because of the high cost, but also because of the disadvantages of the passive data carrier described earlier, since all of these data carriers must be inserted into a reading device.

Finally, data transmission by radio is also known, where on automobile manufacturing assembly lines, information can be retrieved from data carriers placed on cars to be manufactured that specifies the next manufacturing step. In contrast to the data systems mentioned above, here long-distance transmission eliminates inserting the data carrier in a control station. Certain movement flows are arranged along an automatized assembly line, i.e., communication between the control device and the data carrier is clear, and interference from subsequent, previous and "overtakinq" data Carriers is impossible. Long-distance control of this type is therefore impossible for the applications above, since an orderly passage with enough distance between cannot be achieved in a crowded line of people, and in cases where the data on a certain data carrier must be checked, the presence of data carriers that are not supposed to be checked cannot be ruled out.

The invention has now set itself the goal of creating a multi-use control system without the above-mentioned disadvantages, which makes possible clear communication between the control station and a single data carrier.

The invention achieves this by having the communication space of each sending/receiving unit in an area surrounding the control station that is smaller than the object to the acquired so that data transmission within the acquisition space results only after the data carrier approaches the area surrounding the control station.

By limiting the communication space to a size that safely excludes the possible presence of an outside data carrier and at least also makes deliberate interference by such a data carrier difficult, comfortable, time-saving long-distance control is achieved which requires conscious, deliberate manipulation of the data carrier and is thus comparable to insertion in a slot.

For identification or access, the data carrier must be placed in the limited communication space of the sending/receiving unit of the control station, but does not have to be positioned exactly or inserted into an input. There, in a very short amount of time, preferably under one second, the authorization and/or validity of the authorization is checked. It is rather obvious that this expedites passage through the control station and reduces waiting time. This time savings is especially evident at highway toll booths or ski lifts, for example.

Because of its contact-free data transmission, the invented device improves operational security, since the limited communications space, whose dimensions conform to the object to be read, is shielded from foreign influences in practice by the object itself.

In an acquisition space for people to be passed through an access in one lane, the largest range of communication space is 10 cm to 30 cm, preferably 20 cm, for example.

For motor vehicles to be passed through in one lane, the largest range of the communication space can be between 50 cm and 200 cm, preferably 250 cm. In the case of through or drive-through lanes, this range is primarily vertical to the lane. For this, the communication space is designed especially to be round or cylindrical.

One preferred design has data transmission via radio, using a carrier frequency up to 100 kHz especially. This requires low sending power, which is essential for the power supply of the data carrier and further permits the use of magnetic antennae, so that no undesired shielding effect occurs.

So as not to cause interference in alternate communication, one preferred version provides that the carrier frequencies on which data is transmitted from the control station to the data carrier and from the data carrier to the control station be different. In this way, one sending oscillator in the control station will be sufficient if the sending/receiving unit of the data carrier contains a frequency divider.

In another design, data transmission via light waves is provided, and here especially each sending/receiving unit is designed for the infrared field.

Since another preferred design of the data carrier has a standby switch which is activated by a signal from the control station and/or the initialization station, a minimal amount of power is also used so that frequent, long term use over the years is possible. In such applications as season tickets or annual tickets, data carriers are also recommended for mass use, since the set-up cost of the data carrier amounts to an acceptable percentage of the value it presents.

The initialization station can also perform the data entry, activation of the standby switch and, if need be, transmission of power inductively, if it and the data carrier contain corresponding transmission elements. These are then provided in the data carrier as well as in the sending/receiving unit.

A data carrier to be used in a device, according to the invention, has a housing, in which there are at least one sender, one receiver, a read/write memory and a power source.

In order to make the data contained in the data carrier visible to the user, a liquid crystal display is supplied as a practical supplement of the read/write memory (by pressing a key repeatedly). Various data can be displayed or can be displayed automatically after a certain time by pressing a key once. This version of the data carrier can be extended even further in another version of the invention whose housing contains an electronic clock mechanism so that the data carrier can also be used as a regular clock.

Primarily for use as a ticket to ride or an entrance ticket, it is an advantage if the housing has a device for keeping a picture of the owner of the data carrier. For this, it is preferable for the device to have a transparent removable cover with a sticky layer on which a photo can be pasted in order to prevent unauthorized changing of photos.

In the simplest design, the data to be checked is stored in the initialization station in the data Carrier and scanned by the control station. Since the data carrier contains a read/write memory, repeat use by erasing and inputting new data is allowed. Such a simple design can be used as an annual ticket or long-term ID for repeat events and such, where only the expiration date has to be checked by the control station and stored again after expiration for repeat use.

The application possibilities can be substantially increased when, for example, successive devaluation at each control station is done, until a "supply" corresponding to the purchase price is used up. Such a data carrier can be used, for example, as a multiple-ride ticket, an entry ticket for events with consumption potential (hotel industry, recreation and leisure areas, etc.). This design may have the advantage that a leftover notice can be posted on the display, where what is left conforms to the respective purpose of use, for example, notice of expiration date, notice of next-to-last trip ticket or the like, in order to make it possible to revalidate in time at an initialization station.

A computer can also be used in the data carrier, with the help of which discretionary information and functions that complement or, if need be, overlap one another can be split between the data carrier and the control station. As a power source, a chargeable battery or a solar cell can be used. A usable read/write memory is possible in CMOS technology, for example, by using EEPROM, CMOS-RAM or the like.

In one preferred design of the data carrier, the housing is designed with some means of attaching it to the person or object. The means of attachment naturally conforms to the purpose of use; they can be designed especially for a wristband, as a pin, as a self-sticking layer, as a car key chain, etc. The last two designs are primarily designed for use on cars, to which a toll card or parking garage card is attached in a way that cannot be lost.

It is good if the housing is composed of an upper part and a lower part, preferably inseparable, so the means of attachment can be placed on the lower part.

In another preferred design, the data carrier has an individual visually legible number which is stamped or printed on. By means of the visibly legible number, which is preferably also provided on the photo to be inserted, a log can be placed in the initialization station so that a duplicate can be issued in case of possible loss of the stored data or the data carrier. For this purpose, the initialization station, according to the invention, preferably has a memory that stores the individual numbers assigned to each data carrier with the associated data transmitted to the data carrier. The respective data can then be detected by calling up the number. It is also advantageous to have the individual number entered in the data carrier right during manufacture so that the number can also be called up out of the data carrier memory.

A preferred design of the control station provides that the control station use a first read/write device with its sending/receiving unit for long-distance data transmission to and from data carriers placed in approached arrangement and a second read/write device for cards used til now that are inserted in a slot with, for example, data stored in magnetic or optical form (magnetic track, punched tape, bar code or the like). Both read/write devices preferably have parallel outputs, to which a switcher is connected, which feeds the output signals detected to the peripheral devices by means of the optionally used data carrier.

Such a control station is advantageous, since for single-ride tickets, for example, the manufacturing cost of an active data carrier could be too high. For example, a peripheral device can be constructed as a display to show the results of the control via multicolored lights, where the sender and receiver of the first read/write device and the light bulbs are placed in a housing that has a cover of frosted glass. This permits a space-saving design sealed off from the outside.

The following description of the invention will cover, but not be limited to, the figures in the accompanying drawings.

FIG. 1 shows a schematic representation of a data-entry space for the device in the invention.

FIG. 2 a schematic section of a control station.

FIG. 3 a data carrier in a communication with the control station according to FIG. 2.

FIG. 4 a block diagram of the control station according to FIG. 2.

Figure 5:
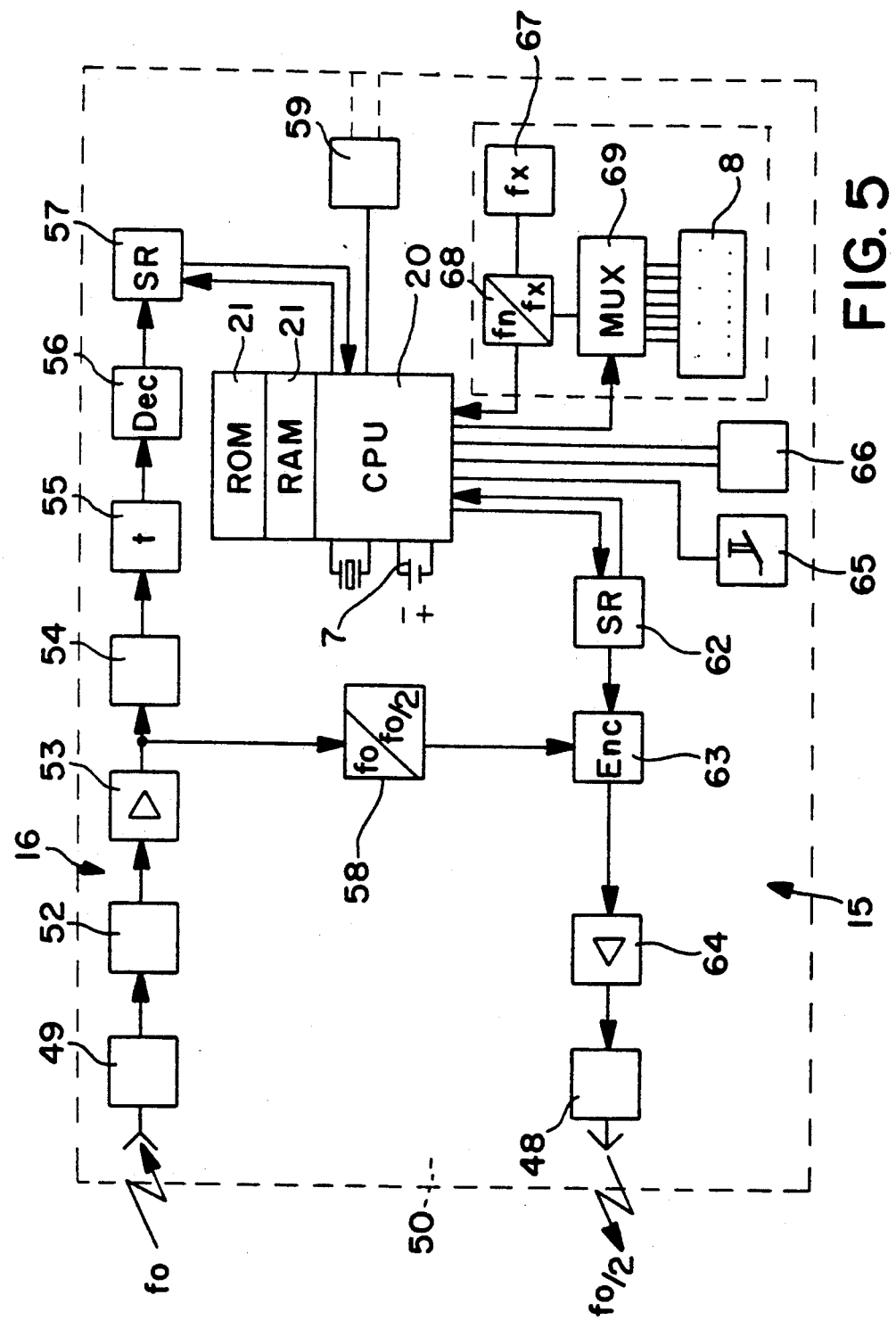

FIG. 5 a block diagram of the data carrier according to FIG. 3.

Figure 6:
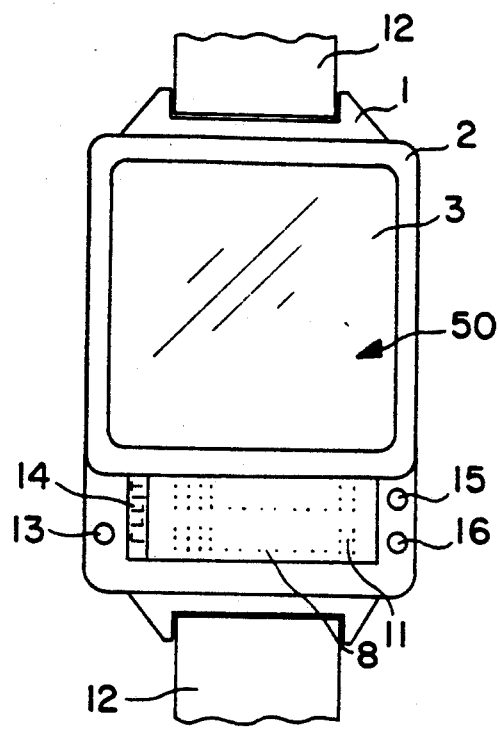

FIG. 6 shows a top view of a modified initial design of a data carrier.

Figure 7:
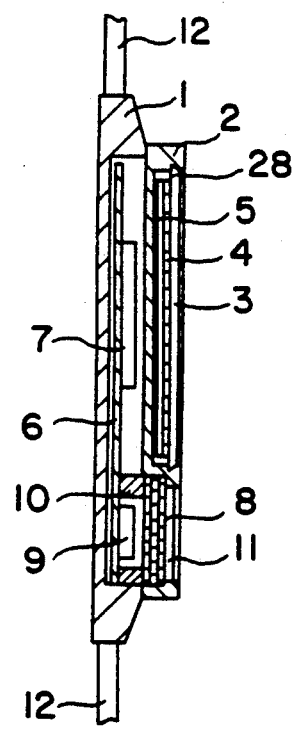

FIG. 7 a longitudinal section across a data carrier according to FIG. 6.

Figure 8:
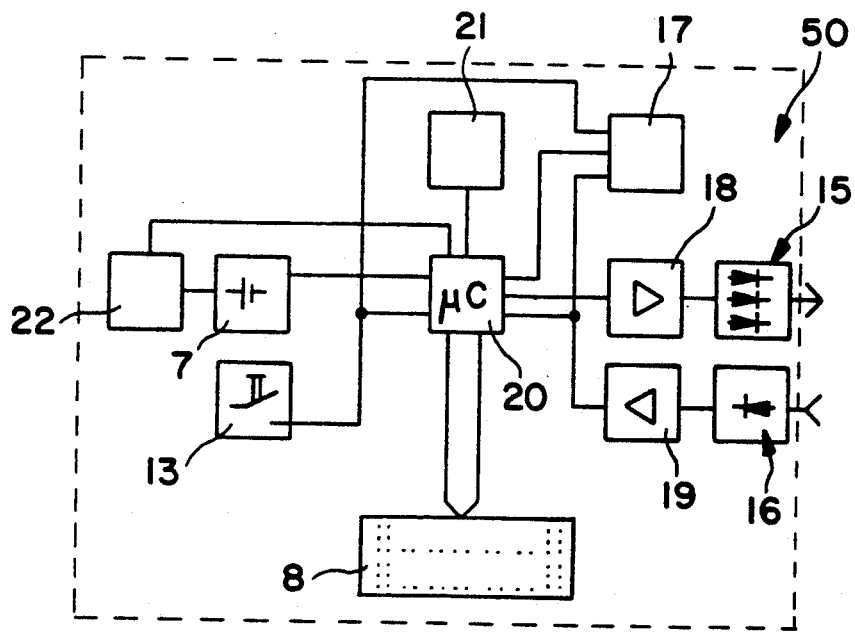

FIG. 8 a block diagram of the data carrier according to FIG. 6.

FIG. 9 a oblique view of a second version of the data carrier.

FIG. 10 a longitudinal section across another design.

FIG. 11 a schematic section across a control station, for communication with a data carrier according to FIGS. 6–8.

Figure 12:
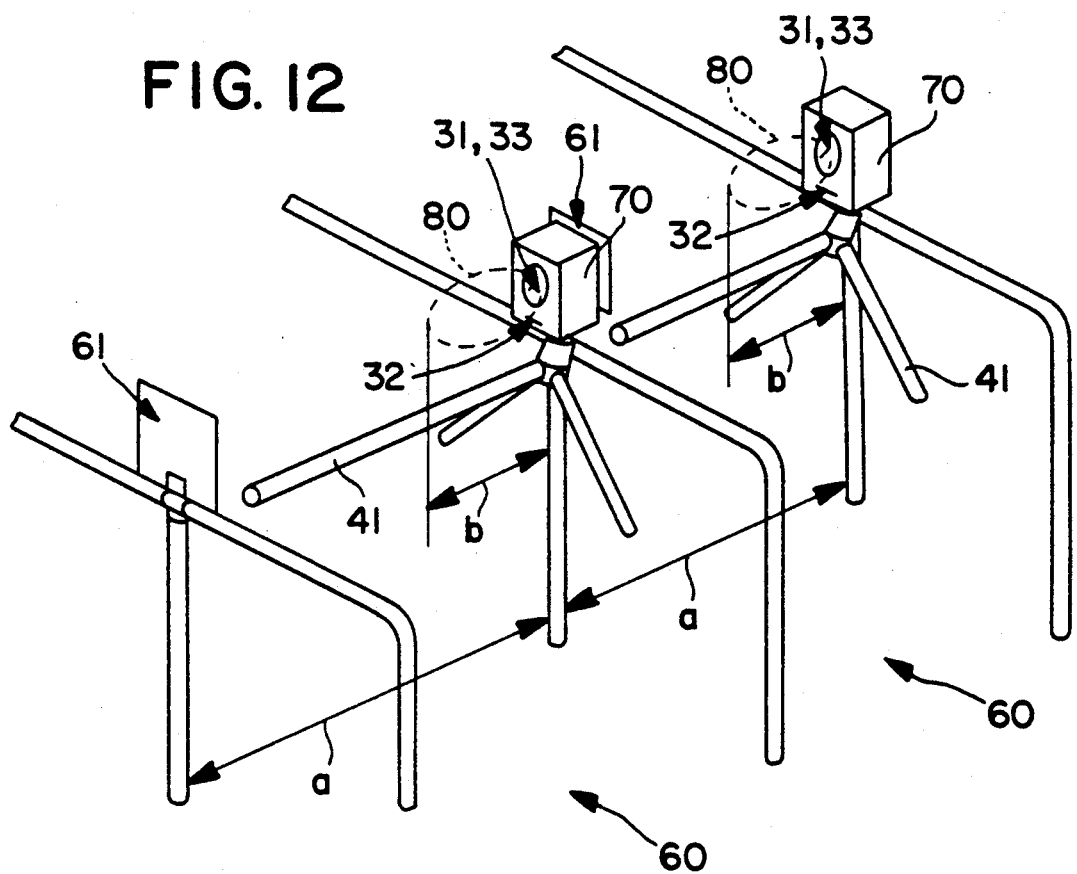

FIG. 12 a dual-lane control area with locks and

Figure 13:
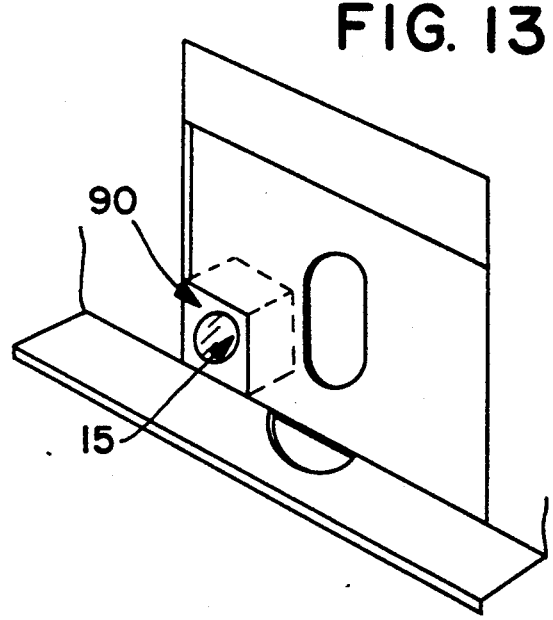

FIG. 13 a schematic arrangement of an initialization station.

According to the invention, the devices provide contact-free communication between a control station 70 and a data carrier 50, where the area 80 surrounding the control station 70 consists of the communication space. This area 80 lies within a data-entry space 60 with tangible or intangible limits 61 whose dimensions match the object 51 that has the data carrier 50 (person or thing). Thus, the data-entry space 60 can, for example, consist of a through lane for people with size a, around which the border 61 of the control station 70 is reserved. Since the surrounding area 80 has a maximum reach b, that is considerably smaller than the size a of the data entry space, for data transmission between the data carrier 50 and the control station 70, the data carrier 50 must be brought into the area surrounding the control station. This means approaching of the object 51 to the control station 70 to an extent that interference in communication by another data carrier that is accidentally or even intentionally present in the access space 60 is practically impossible. If the size a is, for example, between 50 to 70 cm, a recommended maximum reach b for the surrounding area 80 is around 10 to 30 cm.

In the design shown in FIGS. 2 to 5, data transmission is done via radio, where the small reach b mentioned can be attained primarily by a low sending power and recommended antenna design. The sending/receiving frequencies are preferably in the area of up to 250 kHz and under. In this way, a magnetic antenna can also be used for sender 15 and receiver 16, so that no undesired shielding effect occurs.

As can be seen from FIGS. 2 and 3, the sending antenna 71, 48 and the receiving antenna 72, 49 are both located in the housing 30 of the control station 70 (FIG. 2) and also in the data carrier 50 (FIG. 3) at 90° to one another, so that they do not have too strong a magnetic influence on each other. Because of the small reach b of the communication space, in general, the construction of direction-independent antennae is unnecessary. But it is conceivable to have two receiving spools 72, 49 displaced against one another in the control station 70 and/or in the data carrier 50. The housing 30 has a shield 73 on the other side.

Communication between the control station 70 and the data carrier, which has been brought into the surrounding area 80, will be explained in greater detail by means of both block diagrams in FIGS. 4 and 5 of the control station 70 and the data carrier 50.

The control station 70 sends an ID number of a carrier frequency fo (for example, 100 kHz). (FIG. 4) For this, the central unit 75 (CPU) of the control station transmits corresponding data to a shift register 76 (SR). where it is read serially in an encoder 77. The encoder 77 is connected to an oscillator 74 for the carrier frequency fo. The sending antenna 71 operates over a corresponding amplifier 78. The signals given by the control station 70 are received (FIG. 5) in the data carrier 50 by the receiving antenna 49 specified on the carrier frequency. The signals are sent via a limiter 52 and an amplifier 53 to a lowpass filter, which is again connected to a decoder 56.

A timing element 55 (t) is arranged between the lowpass filter 54 and the decoder which prevents accidentally received signals from "waking up" the processor 20 (CPU) in the data carrier.

The decoder 56 transfers the decoded data to a shift register 57 (SR), which wakes up the processor 20 via an interrupt so that the read recognition received can done.

The processor 20 calculates the read recognition with a set algorithm and now also sends its own data carrier number back to the control station 70. To send traffic from the data carrier 50 to the control station 70, the data carrier 50 needs the carrier frequency $f_o$. This goes via a frequency divider 58

$$\left(\frac{f_o/f_o}{2}\right)$$

to an encoder 63, which receives the corresponding data via a shift register 62 (SR) from the processor 20. The sending frequency now amounts to fo/2. This setting has the advantage that in the data carrier 50, no separate constant oscillator is required that is coordinated with the control station 70. The signals go through an amplifier 64 and sending antenna 48 of the data carrier 50 to the receiving antenna 72 of the control station 70. From there, they go via an amplifier 81 and a lowpass filter 82 to a decoder 83.

From the decoder, the data goes into a shift register 84 in the central unit 75. This calculates the data received with the same algorithm as they data carrier 50 and can recognize any attempts at manipulation, where a frequency divider 79 is assigned to the sending oscillator 74. The same sending frequency fo/2 from the data carrier 50 can thus be compared directly.

If, for example, either the control station 70 or especially the data carrier 50 is simulated by a forgery, the real respective partner can interrupt the data transmission for a short time or long term after a certain number of attempts to transmit.

After this initial data traffic, the control station 70 and the data carrier 50 recognize one another, and a check of the validity of both partners takes place simultaneously, so that the only data traffic that can result is that which is dependent on concrete use. After the end of this data transmission, the control station 70 switches free for the next use and again calls with its ID until the next response from a subsequent data carrier 50 is received.

As just mentioned, the processor 20 of the data carrier is normally in sleep mode, that is, an inactive type of operation with minimal power use. It goes into action only when valid data is received.

But it is possible to wake up the processor 20 via a built in key 65 and, for example, to show the status at the time (number and value of stored authorizations), as well as the transactions (FIG. 5) on the display.

Finally, it is even possible to connect a keyboard 66, for example, for computer functions, to enter personal ID numbers (PIN) etc. And certain actions can be made dependent on the entry of the ID number.

It is also provided to connect a serial interface 59 with the processor 20. The data carrier 50 has its own switch to allow minimal power use during inactive operation. This switch consists of a clock oscillator 67 (fx), a programmable divider 68 (fn/fx) and a multiplexer 59 (MUX) for the LDC display 8. Cycle inaccuracies can also be compared by program control.

The processor 20 memory has the advantage of having a relatively small ROM field and a relatively large RAM field (for example, 1 kb and 4 kb).

In the ROM, only the basic routines for servicing the peripheral-modules and for data traffic are stored. In the RAM, applications-specific programs and all data are stored. In this way, changes can easily be made and all transactions can also be checked after the fact. The modules of the data carrier 50 that were described have the advantage of being integrated in a signal chip with the exception of the quartz, the LCD displays 8 and the sending/receiving antennae 48, 49 as well as several peripheral components.

FIGS. 6 to 8 show a design of a data carrier for optical data transmission, especially via infrared waves.

The electronic components contained in the data carrier 50 are obvious in the block diagram in FIG. 8. The central microprocessor 20 (uC) is connected to a sender 15 comprising infrared sending diodes and a sending logic 18, to a receiver 16 comprising an infrared receiving diode and a receiving logic 19, to which a standby logic 17 is assigned, and to a power source 7, where the power source 7, primarily when it consists of a battery, has a control logic 22. The data to be entered in the data carrier 50 is stored in a read/write memory 21, especially an EEPROM or RAM and can be made visible on a liquid crystal display 8 by touching a button 13. The power source 7 can also be a chargeable battery or a solar cell. In the control station 70, corresponding devices are provided that will be described later.

Each data carrier 50 has a housing which consists of a lower part and an upper part (FIGS. 3, 6, 7, 9 and 10). The housing consists especially of plastic, and both parts 1,2 have the advantage of being bonded together. The lower part 1 of the housing can be designed in various shapes. According to FIGS. 3, 6 and 7 there is a place for a wristband 12 on the lower part so that the data carrier 50 can be worn like a watch on the lower arm or wrist (object 51, FIG. 1). FIG. 9 shows an enlarged lower part 1 in the shape of a card with a pin 23 where an extra field of writing can be attached on the lower part 1. According to FIG. 10, the housing is designed as a key chain, where a string 24 on the lower part 1 is fastened to a key ring 25 and is wound on a spring roller 26. The lower part 1 can also have a self-stick layer. Both of the last two designs mentioned are primarily designed for vehicles (parking garages, toll booths, etc). The upper part 2 has a fastener 28 for a photo 5 or the like which is locked in by a cover 3. The cover has a self-sticking layer 4 on the inside, to which the photo 5 is adhered. The type of adhesive is chosen so that removing the photo 5 will destroy it and exchanging one photo for another will be apparent. Under the cover 3, there is a cover 11 in the upper part 2, under which the liquid crystal display is located 8. Next to the display or photo Cover 3 are the sender 15 and receiver 16 for inputting and outputting data. The button 13 serves, as mentioned, to make the data contained in the data carrier 50 visible on the display 8. On the display 8, there is provided, with a number field 14, a visually legible, individual number that can be stamped or printed, for example. The same "running number" can also be placed on the cover 3 or on the photo 5. The display 8 is stored in the regular way by keying in by contact 10 with a chip 9, which is arranged on a an underlayer. The power requirement comes from a power source 7, for example, a battery, solar cell, etc.

FIG. 11 is a schematic of a control station 70 that is equipped to use two different systems. It has a housing 30, in the upper part of which is a first read/write device 31 and in the lower part of which is a second read/write device 32. This first read/write device 31 contains a send/receive unit, which is designed for radio transmission according to FIG. 2 and has just been described. For the infrared transmission, the send/receive unit 15, 16 contains a sending diode 27 and a receiving diode 47, an infrared filter 45, a control unit 35 and an electronic analyzer 38, as well as a two-color light with a red and green bulb 34. The sending and receiving diodes 27, 47, the colored bulbs 34 and a superior optical system 36 which is arranged ahead, are placed in an input space 29 that is covered on the outside with a sheet of frosted glass 37.

The second read/write device 32 serves as a data carrier control, for example, for one time entry, on which the data is stored magnetically or optically, for example, and it can normally be pushed into a slot 42 where the stored data is read by a read/write head 43 and fed into an electronic analysis system 46. A printer head 44 is also connected to it. Depending on the type of data carrier to be checked by the electronic analysis system, the signals flow via a switcher 39 to a lamp 33 and connected peripheral devices, like a computer, a barrier, a turnstile 41, etc; FIG. 12 shows an example of the latter at a ski lift control station. FIG. 13 shows schematically an initialization station 10 in the form of a ski lift check-in. The initialization station 90 serve to input the data to be checked in the control station 70 into the read/write memory 21 of each data carrier 50 and has at least one sender 15, for example. The data can, however, also be read inductively or by contact. But here additional measures can be taken for locking, if need be. In this way, a first sending signal via the standby logic in the data carrier 50 is activated and its memory 21 is then reserved. In order to recover stored data if it gets lost (data loss through power failure, etc.), the initialization station 90 also must have a memory which serves as a numerical log. This means that during utilization of the data carrier 50, its visually legible, individual numbers are coded with the valid dates to the data carrier 50 and they are arranged in numerical order respectively in the memory of the initialization station 90. By calling up a number, the valid dates can then be detected. Since the active data carrier 50 is designed for long-term multiple applications, the earlier data is erased upon new initialization.

For each check of an active data carrier 50, it is held in the communication space in the surrounding area 80 of the first read/write device 31 of the control station 70 (FIG. 1), where a sending signal from the control station activates the standby logic of the data carrier 50, whereupon the stored data Can be scanned. If the data carrier consists of a multiple trip or punch card, at the control station 70 not only is the validity checked, but also partial de-validation is done. With this type of data carrier, additional storage of its individual numbers is a special advantage, since keeping records of the continuous de-validation can be done at the control station, and the respective data can be transferred to the numeral log of the initialization station 90.

Since the data carrier 50 contains the processor 20, discretionary information and functions that expand upon or, if need be, overlap one another can be distributed between the data carrier 50 and the control station 70.

Through short-distance data transmission, especially expeditious control is possible, which makes it easier and pleasanter for the owner of the data carrier 50 to use, since he need only put it in the communication space in the area 80 surrounding the control station 70. Since new initialization is possible right after expiration, the higher production costs of active data carriers 50, especially for yearly or seasonal cards, ski passes, etc, are not as significant. Single-entry, like one-trip passes or the like can also be checked in the control station described according to FIG. 11 by means of the previous cards, that is, passive data carriers, which can be inserted into the second read/write device 32 of the control station 70 in the usual way.

The device described can also be used for any object 51, i.e., not just for persons, but also for items, in a sorting or processing line.

A basic aspect of the device, according to the invention, consists of the fact that the data carrier can contain a lot of different authorizations and values. For example, data carriers can have a season ticket for ski lifts, prepaid amounts of automobile gas, authorizations for use of parking garages, etc.

Furthermore, it can also be an advantage if the data carrier can be relied on to send a special ID by means of a key. This function can, for example, be used for turning off an alarm, if the data carrier owner is exposed to some danger. For example, in a parking garage several individual receivers with greater sensitivity can be provided in the park decks to receive an alarm call even at a great distance.

We claim:

1. A data carrier for a non-contact remote data communication with a control station, the control station controlling a passage to one of a plurality of different areas or spaces by checking and/or changing data of authorization of passages on the data carrier when the data carrier is approached to the control station, the data carrier comprising:

a memory designed to store data of at least two independent authorizations, each authorization being specific to one of the different areas or spaces;

A microprocessor, the microprocessor partially comprising the memory, the microprocessor further comprising means for performing discretionary functions on the data of each authorization and further comprising means for controlling operations of the data carrier;

a power-supply unit for providing power to the data carrier;

a data sending-receiving unit for receiving data from the control unit and transmitting data to the control unit;

an electronic clockwork for maintaining an indication of the time of day;

a digital display for selectively displaying the data of each authorization stored in the microprocessor;

an operating button for selecting what will be displayed on the digital display; and a fastening means for connection of the data carrier to the owner of the data carrier.

2. Data carrier according to claim 1 further comprising a means for receiving a picture of the owner.

3. Data carrier according to claim 2 wherein said means for receiving a picture of the owner comprises a transparent, detachable cover that is provided with an adhesive coating at its inner side.

4. Data carrier according to claim 3 wherein an individual, visualy readable number is impressed or printed on the picture to be inserted as well as on a part connected to the memory.

5. Data carrier according to claim 1 wherein the data carrier further comprises a housing on which a wristband is provided as said fastening means, thereby forming a wrist watch.

6. Data carrier according to claim 1, further comprising a housing and a spring-loaded string wound up in the housing and having an outside end, a key ring being provided at said end as said fastening means.

7. Data carrier according to claim 1, further comprising a stand-by circuit which can be activated by a signal emitted by the control station.

8. Data carrier according to claim 4, wherein said memory is further adapted to store said number.

9. A device according to claim 1, wherein the largest reach of the communication space of each sending-receiving unit in an acquisition space for people, particularly in an individual passageway for people, amounts to between 10 and 30 cm.

10. A device according to claim 1, wherein the sending-receiving unit for radio transmission is designed with a preferred carrier frequency field up to 250 kHz.

11. A device according to claim 10, wherein the sending-receiving unit has magnetic antennae.

12. A device according to claim 10, wherein the carrier frequencies for data transmission from the control station to the data carrier, as well as from the data carrier to the control station are different.

13. A device according to claim 12, wherein the sending-receiving unit of the control station contains a sending oscillator for generating the carrier frequency for data transmission from the control station to the data carrier, and the sending-receiving unit of the data carrier contains a frequency divider for generating the carrier frequency for data transmission from the data carrier to the control station.

14. A device according to claim 1, wherein each sending-receiving unit is designed for light-wave transmission.

15. A device according to claim 14, wherein each sending-receiving unit is designed for the infrared field.

16. Data carrier according to claim 7, wherein said stand-by circuit is adapted to prevent said power supply from providing power to said microprocessor until receipt of said signal emitted by the control station.

* * * * *